(12) United States Patent
Castorina et al.

(10) Patent No.: US 11,675,702 B1
(45) Date of Patent: Jun. 13, 2023

(54) REPLACEMENT POLICY INFORMATION FOR TRAINING TABLE USED BY PREFETCH CIRCUITRY

(71) Applicant: Arm Limited, Cambridge (GB)

(72) Inventors: Ugo Castorina, Antibes (FR); Damien Matthieu Valentin Cathrine, Mougins (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/673,301

(22) Filed: Feb. 16, 2022

(51) Int. Cl.
| | |
|---|---|
| *G06F 12/0862* | (2016.01) |
| *G06F 12/0871* | (2016.01) |
| *G06F 12/121* | (2016.01) |
| *G06F 9/32* | (2018.01) |
| *G06F 9/30* | (2018.01) |
| *G06F 12/02* | (2006.01) |
| *G06F 18/214* | (2023.01) |

(52) U.S. Cl.
CPC ...... *G06F 12/0862* (2013.01); *G06F 9/30047* (2013.01); *G06F 9/321* (2013.01); *G06F 12/0238* (2013.01); *G06F 12/0871* (2013.01); *G06F 12/121* (2013.01); *G06F 18/214* (2023.01)

(58) Field of Classification Search
CPC .. G06F 9/30047; G06F 9/321; G06F 12/0238; G06F 12/0862; G06F 12/0871; G06F 12/121; G06F 18/214
See application file for complete search history.

(56) References Cited

U.S. PATENT DOCUMENTS

| | | | | |
|---|---|---|---|---|
| 9,582,282 | B2 * | 2/2017 | Hayenga | G06F 12/0862 |
| 10,437,718 | B1 * | 10/2019 | Anghel | G06F 12/0862 |
| 2018/0089085 | A1 * | 3/2018 | Kothinti Naresh | G06F 12/0862 |
| 2019/0079877 | A1 * | 3/2019 | Gaur | G06F 12/0811 |
| 2021/0406183 | A1 * | 12/2021 | Mashimo | G06F 12/0862 |

\* cited by examiner

*Primary Examiner* — Aracelis Ruiz
(74) *Attorney, Agent, or Firm* — Nixon & Vanderhye P.C.

(57) ABSTRACT

Prefetch circuitry generates prefetch requests to prefetch information to a cache, based on prediction information trained using a training table comprising training entries. A given training entry associates a program counter indication associated with a trigger training memory access, a region indication indicative of a memory address region comprising a target address specified by the trigger training memory access, corresponding prediction information trained based on subsequent training memory access requests specifying target addresses in the same region as the target address of the trigger training memory access, and first and second replacement policy information. The first replacement policy information is used for replacement of an entry with another entry for the same program counter indication but different region. The second replacement policy information is used for replacement of an entry with another entry for a different program counter indication. This helps to increase prediction performance and reduce power consumption.

19 Claims, 6 Drawing Sheets

REPLACEMENT POLICY INFORMATION FOR TRAINING TABLE USED BY PREFETCH CIRCUITRY

BACKGROUND

Technical Field

The present technique relates to the field of prefetching.

Technical Background

Prefetching is a technique used by a data processing apparatus to mitigate against the latency associated with memory access, by initiating the retrieval of data values or instructions from memory before the data processing apparatus encounters the corresponding requests for those data values to be loaded or instructions to be fetched. The prefetch requests can be generated based on training information, learnt from previously seen memory access requests, which is used to predict which addresses are likely to be accessed in future.

SUMMARY

At least some examples of the present technique provide an apparatus comprising:

processing circuitry to issue memory access requests in response to processing of instructions;

prefetch circuitry to generate prefetch requests to prefetch information to a cache, based on prediction information trained using a training table comprising a plurality of training entries providing information derived from training memory access requests, a given training entry of the training table associating a program counter indication indicative of a program counter address associated with a trigger training memory access, a region indication indicative of a memory address region comprising a target address specified by the trigger training memory access, corresponding prediction information trained based on one or more subsequent training memory access requests specifying target addresses in the same memory address region as the target address of the trigger training memory access, first replacement policy information, and second replacement policy information; and replacement control circuitry to control, in response to detecting a region-mismatching training memory access request specifying a target address in a new memory address region which fails to correspond to the region indication of any valid training entry of the training table, whether to allocate a new valid training entry to the training table for the new memory address region; in which:

in response to detecting that a program counter address associated with the region-mismatching training memory access request corresponds to the program counter indication of a program-counter-matching valid training entry, the replacement control circuitry is configured to perform a first replacement policy determination to determine, based on the first replacement policy information of the program-counter-matching valid training entry, whether to replace the program-counter-matching valid training entry with the new training entry for the new memory address region; and in response to detecting that the program counter address associated with the region-mismatching training memory access request fails to correspond to the program counter indication of any valid training entry and there is no invalid entry available for allocation as the new training entry, the replacement control circuitry is configured to perform a second replacement policy determination to determine, based on the second replacement policy information of one or more candidate valid training entries, whether to replace one of the candidate valid training entries with the new training entry for the new memory address region.

At least some examples of the present technique provide a method comprising:

training prediction information used to generate prefetch requests to prefetch information to a cache, using a training table comprising a plurality of training entries providing information derived from training memory access requests issued by processing circuitry in response to processing of instructions, a given training entry of the training table associating a program counter indication indicative of a program counter address associated with a trigger training memory access, a region indication indicative of a memory address region comprising a target address specified by the trigger training memory access, corresponding prediction information learnt from one or more subsequent training memory access requests specifying target addresses in the same memory address region as the target address of the trigger training memory access, first replacement policy information, and second replacement policy information; and controlling, in response to detecting a region-mismatching training memory access request specifying a target address in a new memory address region which fails to correspond to the region indication of any valid training entry of the training table, whether to allocate a new valid training entry to the training table for the new memory address region; in which:

in response to detecting that a program counter address associated with the region-mismatching training memory access request corresponds to the program counter indication of a program-counter-matching valid training entry, a first replacement policy determination is performed to determine, based on the first replacement policy information of the program-counter-matching valid training entry, whether to replace the program-counter-matching valid training entry with the new training entry for the new memory address region; and in response to detecting that the program counter address associated with the region-mismatching training memory access request fails to correspond to the program counter indication of any valid training entry and there is no invalid entry available for allocation as the new training entry, performing a second replacement policy determination to determine, based on the second replacement policy information of one or more candidate valid training entries, whether to replace one of the candidate valid training entries with the new training entry for the new memory address region.

At least some examples of the present technique provide a non-transitory computer-readable medium to store computer-readable code for fabrication of an apparatus comprising:

processing circuitry to issue memory access requests in response to processing of instructions;

prefetch circuitry to generate prefetch requests to prefetch information to a cache, based on prediction information trained using a training table comprising a plurality of training entries providing information derived from training memory access requests, a given training entry of the training table associating a program counter indication indicative of a program counter address associated with a trigger training memory access, a region indication indicative of a memory address region comprising a target address specified by the trigger training memory access, corresponding prediction information trained based on one or more subsequent training memory access requests specifying target addresses in the same memory address region as the target address of the trigger training memory access, first replacement policy information, and second replacement policy information; and replacement control circuitry to control, in response to detecting a region-mismatching training memory access request specifying a target address in a new memory address region which fails to correspond to the region indication of any valid training entry of the training table, whether to allocate a new valid training entry to the training table for the new memory address region; in which:

in response to detecting that a program counter address associated with the region-mismatching training memory access request corresponds to the program counter indication of a program-counter-matching valid training entry, the replacement control circuitry is configured to perform a first replacement policy determination to determine, based on the first replacement policy information of the program-counter-matching valid training entry, whether to replace the program-counter-matching valid training entry with the new training entry for the new memory address region; and in response to detecting that the program counter address associated with the region-mismatching training memory access request fails to correspond to the program counter indication of any valid training entry and there is no invalid entry available for allocation as the new training entry, the replacement control circuitry is configured to perform a second replacement policy determination to determine, based on the second replacement policy information of one or more candidate valid training entries, whether to replace one of the candidate valid training entries with the new training entry for the new memory address region.

Further aspects, features and advantages of the present technique will be apparent from the following description of examples, which is to be read in conjunction with the accompanying drawings.

DESCRIPTION OF EXAMPLES

Figure 1:
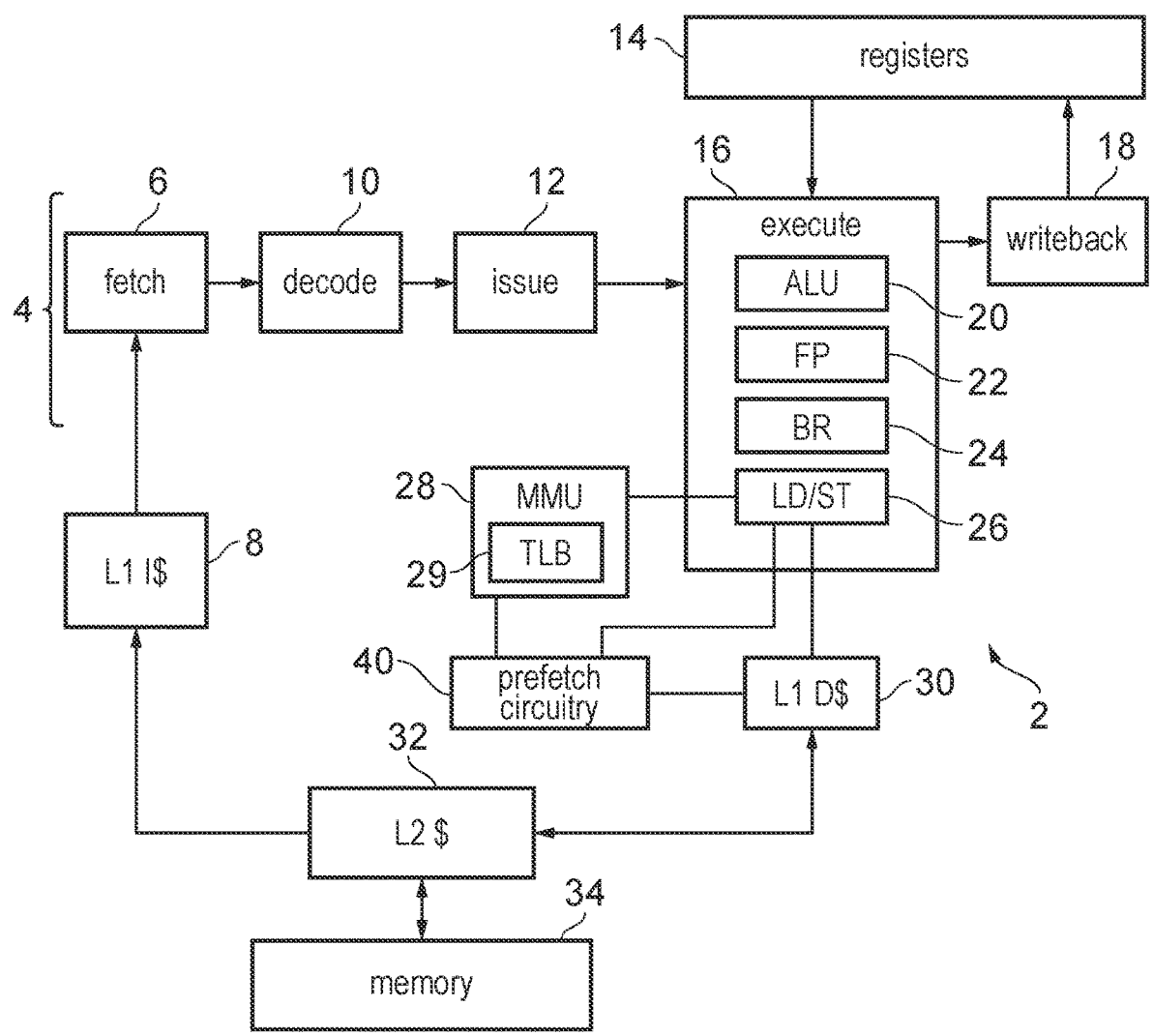
FIG. 1 illustrates an example of a data processing system having prefetch circuitry.

An apparatus has processing circuitry to issue memory access requests in response to processing of instructions, and prefetch circuitry to generate prefetch requests to prefetch information to a cache. The prefetch circuitry generates the prefetch requests based on prediction information trained using a training table comprising a plurality of training entries providing information derived from training memory access requests. A given training entry of the training table associates a program counter (PC) indication indicative of a PC address associated with a trigger training memory access, a region indication indicative of a memory address region comprising a target address specified by the trigger training memory access, and corresponding prediction information trained based on one or more subsequent training memory access requests specifying target addresses in the same memory address region as the target address of the trigger training memory access. Such a prefetching scheme can be helpful because it can be common that there may be a stream of memory accesses targeting different addresses in the same region of address space and so by learning correlations between a trigger training memory access which initially accesses a given region of address space and subsequent accesses made to the given region, this can help learn patterns of prefetch addresses which can be used for prefetch requests to be generated when the trigger access having a PC corresponding to the PC indication is later seen again. This type of prefetching scheme may have relatively wide application to a variety of different workloads.

However, a problem with this type of prefetch approach is that an instruction having a given PC indication may switch between accessing different regions of the memory address space. If an instruction at a given PC indication accesses one or more addresses in first region, then switches to a second region, and later switches back to the first region, there is a risk that the accesses in the second region may cause the training entry allocated for the combination of the given PC indication with the first region to be replaced with a new entry for the given PC indication and the second region, so that when accesses later switch back to the first region then the relevant training information gathered in the previous accesses to the first region may already have been lost (or at least may be slower to restore back into the training table in implementations which allow evicted information to be retained in a further structure). Such thrashing between different regions for the same PC indication may prevent the prefetch circuitry being able to adequately learn the access patterns for any of the regions accessed following the trigger access having that PC indication, causing a reduction in prefetch prediction success rate and hence loss of processing performance for the processing circuitry.

In the examples discussed below, replacement of entries in the training table is based on first replacement policy information and second replacement policy information that is associated with the PC indication, region indication and prediction information in a given training entry. Replacement control circuitry is provided to control replacement of an existing valid training entry of the training table with a new valid training entry. The first replacement policy information is used for replacement of an entry with another entry for the same program counter indication but a different region. The second replacement policy information is used for replacement of an entry with another entry for a different program counter indication and different region. This helps to increase prediction performance and reduce power consumption.

Hence, in response to detecting a region-mismatching training memory access request specifying a target address in a new memory address region which fails to correspond to the region indication of any valid training entry of the training table, the replacement control circuitry controls whether to allocate a new valid training entry to the training table for the new memory address region. A different approach to replacement control is taken depending on whether a PC address associated with the region-mismatching training memory access request corresponds to the PC indication of an existing valid training entry. In response to detecting that a PC address associated with the region-mismatching training memory access request corresponds to the PC indication of a program-counter-matching valid training entry, the replacement control circuitry performs a first replacement policy determination to determine, based on the first replacement policy information of the program-counter-matching valid training entry, whether to replace the program-counter-matching valid training entry with the new training entry for the new memory address region. On the other hand, in response to detecting that the PC address associated with the region-mismatching training memory access request fails to correspond to the PC indication of any valid training entry and there is no invalid entry available for allocation as the new training entry, the replacement control circuitry performs a second replacement policy determination to determine, based on the second replacement policy information of one or more candidate valid training entries, whether to replace one of the candidate valid training entries with the new training entry for the new memory address region.

Hence, by providing replacement policy determinations based on different first and second replacement policy information depending on whether a region-mismatching training memory access, which is requesting access to a new region not matching any existing region tracked in the training table, matches the PC indication of an existing entry or not (rather than the alternative of using a single replacement policy for all replacement decisions regardless of whether the replacement is of an entry with same PC indication or different PC indication), this can allow more careful decisions on whether to replace an existing entry with a new entry for the same PC indication, so as to reduce the likelihood of thrashing between different regions for the same PC indication, and hence can improve performance in the case of an input stream of memory accesses with a wide number of PC/region combinations for the same PC.

The first replacement policy information may be dedicated to controlling replacement of an entry for a given PC indication and a given region with an entry for the same given PC indication and a different region. The first replacement policy information may not be used for controlling replacement of entry for one PC indication with a new entry for a different PC indication. Hence, the second replacement policy determination can be made by the replacement control circuitry independent of the first replacement policy information. Also, the first replacement policy determination can be made by the replacement control circuitry independent of the second replacement policy information.

In some examples, the prefetch circuitry uses the training table to learn prediction information for a single memory address region per PC indication. Hence, the structure of the training table may be such that it is not possible to simultaneously be training prediction information for more than one region per PC indication. Restricting to one region per PC can reduce the amount of storage circuitry required for the training table as well as simplifying the associated access control logic for accessing the training table, so can save circuit area and power. The replacement policy using the first and second replacement policy information as discussed above can be particularly useful for such a prefetch implementation, because when it is not possible to store more than one set of region predictions per program counter indication, then when a new region is accessed for a PC corresponding to the same program counter indication as a previously tracked entry, it is not possible to replace any entry other than the PC-matching valid training entry which corresponds the same program counter indication. This means the thrashing problem discussed above is likely to cause a greater performance impact for implementations with a single region per PC indication. Therefore, it can be useful to use dedicated first replacement policy information to control the decision on whether to replace the PC-matching valid training entry with the new training entry, separate from the second replacement policy determination used in cases when the new training entry would replace an entry for a different PC indication, to allow for skewing of the probability of replacement to reduce the likelihood of the thrashing problem causing a PC-matching valid training entry being replaced too early.

Nevertheless, the replacement control based on the first and second replacement policy information described above could also be used in implementations which support learning predictions for multiple regions per program counter indication. Even in such an embodiment it may occasionally be useful to prevent predictions for a given PC/region pair being discarded too early, by using a dedicated first replacement policy information to control that replacement, separate from the second replacement policy information used to control replacement of an entry with an entry for a different PC indication.

A probability of the new training entry being allocated to the training table in the first replacement policy determination may be lower than a probability of the new training entry being allocated to the training table in the second replacement policy determination. This is useful to bias the replacement decisions so that it is less likely that an entry will be replaced if it is being replaced with a new entry for a different region but the same PC than when the entry is being replaced with a new entry for a different region and a different PC. This will tend to prolong the period of training for any given PC/region pair when processing a workload which has an access at a given PC alternating between accesses to different regions, increasing the likelihood that effective prefetch predictions can be made for one of these regions.

The training memory access requests may be a subset of the memory access requests issued by the processing circuitry. In some examples, all memory access requests issued by the processing circuitry may be treated as training memory access requests. However, in practice, as training the prefetch circuitry may be relatively expensive in terms of dynamic power consumption and circuit area, some implementations may prefer to use only a proper subset (i.e. not all) of the memory access requests issued by the processing circuitry as training memory access requests to be used to train the predictions made by the prefetch circuitry. For example, memory access requests which already hit in a cache could be omitted from the subset of training memory access requests, as the hitting requests may already be relatively quick to service and so the limited training resource can be used to greater performance effect by focusing on learning information about memory access requests which miss in the cache. Some prefetcher implementations may also use sampling to select a subset of the memory access requests for training. For example, the sampling could be done randomly or could be based on counters which count memory access requests and periodically select a new request as a training example once the counter has reached a certain threshold.

The association between the PC indication, region indication, prediction information and first and second replacement policy information can be indicated in a number of different ways within a given training entry. Some implementations may use a training entry format which has explicit fields for all of these types of information. However, it is also possible that at least one of these pieces of information may not be indicated explicitly in the training entry. For example, the PC indication could be omitted from the training entry itself and used as an index into the training table structure which selects which training table entry is to be read, to avoid needing to store the full PC indication in the training table structure. In some cases the full PC indication could be used as an index to avoid storing any part of the PC indication in the training table structure. Alternatively, part of the PC indication may be used as an index and the other part as a tag stored in the training entry. A variety of indexing schemes are possible. Hence, although the PC indication may not be fully stored in the training entry, the combination of any stored tag and index may nevertheless associate the PC indication with the other contents of the corresponding entry.

The PC indication can be any value which can be used as an indication of the PC address associated with the trigger training memory access. In some cases, this can simply be the PC address itself. The PC address associated with the trigger training memory access may be the instruction address used to fetch the instruction which caused the trigger training memory access.

However, it is not essential for the full PC address to be recorded as the PC indication in the training table. In some examples, to reduce circuit area cost it may be useful for the PC indication to be as a value with fewer bits than the PC address of the trigger training memory access itself. For example, the PC indication could be a subset of the bits of the PC address, or could be a hash value obtained by applying a hash function to the PC address. With this approach, the PC indication may be an imprecise representation of the PC address, and comparing the PC indication for a particular training entry with a PC indication derived from a training memory access request could sometimes lead to false positive matches being detected in cases where the PC address of the training memory access request did not actually match the PC address of the trigger training memory access defined for the particular training entry.

In a similar way, while it is possible for a region indication to be identified precisely, other implementations may also use a hash or other reduced-bit representation of the memory address region to reduce the number of stored bits per training entry. Hence, for both the comparison of PC indication and the comparison of region indication, it will be appreciated that an approximate comparison can be used and so some false positive matches may occasionally be detected. The level of precision in the PC indication and region indication may be a trade-off between accuracy and power/area cost.

In the case when the PC address associated with the region-mismatching training memory access request fails to correspond to the PC indication of any valid training entry and there is no invalid entry available for allocation, the candidate valid training entries considered for replacement with the new entry in the second replacement policy determination could either be all the training entries of the training table, or could be just a proper subset of the training entries. For example, if the training table is implemented as a set-associative structure then an entry for a given PC indication may be allowed to be allocated to a limited set of entries of the training table (the set selected based on the PC indication) and the entry for that given PC indication may be prohibited from being allocated to entries outside that set. Hence, the candidate valid training entries could be a set of entries selected based on the PC indication of the region-mismatching training memory access request.

The replacement control circuitry controls replacement of a training entry in cases when a training memory access request is seen which does not match any of the regions already been tracked by valid training entries. On the other hand, if the training memory access request is a region-matching training memory access request specifying a target address in an already tracked memory address region corresponding to the region indication of a region-matching valid training entry of the training table, the prefetch circuitry updates the prediction information of the region-matching valid training entry based on the region-matching training memory access request. Hence, in this case no training entry replacement is required. For updating the prediction information, the region-matching training memory access request does not need to have PC indication corresponding to the PC indication of the region-matching valid training entry. In other words, for determining whether to update predictions tracked in the training table, the comparison between a new training memory access request and information tracked in a given training entry may be independent of the PC indication of that training entry or the PC associated with the new training memory access request, but may be based on a region comparison.

The PC indication may, however, be used for prefetch generation (the generation of the prefetch request to actually prefetch data into the cache) and for replacement as described earlier. Hence, for the prefetch generation, the prefetch circuitry can perform a prefetch prediction lookup in the training table based on a PC address associated with an issued memory access request, and in response to detecting that the PC address associated with the issued memory access request corresponds to the PC indication of a corresponding valid training entry, use the prediction information of the corresponding valid training entry to control generation of one or more prefetch requests. The prefetch prediction lookup may be independent of the region indication of the training entries. Hence, once the prediction information has been learnt based on previously seen accesses to a given region, that prediction information can be applied even when an access for the corresponding PC indication later moves to access a different region. This can help increase the prefetch coverage (fraction of cache misses which can be avoided due to successful prefetches), as the same access pattern may be applied to multiple regions in different passes through an instruction at the same PC. The training table may not necessarily be the only structure looked up in the prefetch prediction lookup. As mentioned further below, some implementations may also perform the prediction lookup in a pattern history table used to retain entries evicted from the training table.

Note that the issued memory access request which is compared with the PC indications of valid training entries in the prediction lookup may also itself be used as a training memory access request in some cases, and so could also trigger prediction information to be updated and/or replacement of entries. Also, in a similar way to sampling of training memory access requests discussed earlier, some implementations may not perform the prediction lookup for all issued memory access requests, but may restrict lookups to a particular subset of issued memory access requests. Other approaches may perform a prediction lookup for all issued memory access requests issued by the processing circuitry.

The prediction information can be any information usable for controlling generation of prefetch request, which is learnt from behaviour detected from training memory access requests. The prediction information may include information for controlling the prediction of which memory addresses to specify for the prefetch requests. For example, the prediction information could be a stride value indicating a stride offset detected between target addresses of respective training memory accesses to the associated memory address space region, in a stream having a consistent stride offset between target addresses of successive accesses.

However, in one particular example, the prediction information specifies one or more offsets of target addresses of the one or more subsequent training memory access requests relative to the memory address region comprising the target address specified by the trigger training memory access. In response to detecting that the PC address associated with the issued memory access request corresponds to the PC indication of the corresponding valid training entry, the prefetch circuitry generates the one or more prefetch requests specifying one or more target addresses determined by applying the one or more offsets specified in the prediction information of the corresponding valid training entry to a reference address based on the target address of the issued memory access request. The reference address may for example be a region address corresponding to the start of the memory address space region comprising the target address.

This approach based on tracking offsets can be particularly useful for improving performance for workloads where a stream of accesses to a given region includes a non-constant stride offset between addresses of one access and the next. By specifying a number of offsets (e.g. using a bitmap indicating the offsets relative to the memory address region comprising the target address), irregular patterns of address accesses can be predicted. The prediction information may be capable of specifying, in association with a given PC indication and a given region indication, a plurality of offsets for a plurality of subsequent training memory access requests. The replacement policy based on first and second replacement policy information is particularly useful in such an embodiment because the use of the first replacement policy information to bias against replacing an entry with another training entry for the same PC indication gives more time for additional offsets to be recorded in the prediction information when accesses return to a previously seen region, helping to improve prefetch coverage.

The prediction information could also include other pieces of information used for controlling training and/or generation of prefetch requests. For example the prediction information could include a confidence indication specifying a level of confidence in the address predictions indicated by the prediction information. The confidence level may be increased in response to seeing training memory access requests which reinforce that a previously tracked prediction is correct and the confidence level may be decreased in response to a training memory access request which indicates a different behaviour from the one indicated by the prediction information. In some cases, generation of prefetch requests may be qualified based on the confidence indication, so that prefetch requests are generated based on a training entry when the confidence indication of the training entry indicates a threshold level of confidence or higher.

Another example of information that can be included in the prediction information is timeliness information which may be an indication of an interval elapsed between encountering the trigger memory access request and encountering the corresponding training memory access request used to set other prediction information. This may be useful because even if the correct prediction can be made for an address of a subsequent access following an earlier trigger access, this may not help to improve cache hit rates if the subsequent access follows too soon after the trigger access so that the prefetch request is not able to allocate the data into the cache in time for the subsequent access. Hence, some prefetch schemes may record in the prediction information an indication of timeliness which can then be used to qualify whether to generate prefetch requests so as to prioritise generation of prefetch requests that are more likely to allow for timely prefetching of information into the cache in time for the memory access that requires the information.

In some examples, the replacement decisions for the first and second replacement policy determinations may also depend on other information other than the first or second replacement policy information. For example, the confidence indication and/or timeliness indication mentioned above could be used for replacement policy determinations in addition to the first or second replacement policy information, to bias the replacement policy towards replacing entries with low confidence and/or poor timeliness behaviour. This may help to prioritise retention of training entries which correspond to useful predictions.

The first and second replacement policy information may be first and second counters used to track whether to replace an entry. Whether an entry is replaced may depend on whether the relevant first or second counter has reached a given threshold. This may provide a mechanism for regulating the probability with which a given entry is replaced.

More particularly, the replacement policy may use the counters as follows.

In response to a new allocation of, or an update of the prediction information for, a given training entry in the training table, the replacement control circuitry may reset the first replacement policy information of the given training entry to a first reset counter value and reset the second replacement policy information to a second reset counter value. Resetting the relevant first and second counters reduces the chance of that entry being replaced because the relevant counter will be further from its expiry value at which the entry is selected for replacement. Hence, resetting the counters to first and second reset counter values on a new allocation or an update to the prediction information can be useful for overall processor performance, because it increases the likelihood that a new entry is given sufficient time to be trained, and that training entries which are still encountering memory accesses to the corresponding address region are retained for further training.

In the first replacement policy determination, in response to detecting that the first replacement policy information has reached a first expiry counter value, the replacement control circuitry determines that the program-counter-matching valid training entry should be replaced with the new training entry for the new memory address region. On the other hand, in the first replacement policy determination, in response to detecting that the first replacement policy information has not yet reached a first expiry counter value, the replacement control circuitry advances the first replacement policy information to a next counter value and determines that the program-counter-matching valid training entry should not be replaced with the new training entry for the new memory address region. Hence, the first replacement policy determination will replace the entry if a certain number of previous instances of accesses to a different region by the same PC have been detected since previously allocating or updating the prediction information of that entry (the number of instances required to trigger a replacement depends on the difference between the first reset value and the first expiry counter value and the step size used for each advancement of the counter).

In the second replacement policy determination, in response to detecting that the second replacement policy information of at least one candidate valid training entry has reached a second expiry counter value, the replacement control circuitry selects one candidate valid training entry having the second replacement policy information that has reached the second expiry counter value as a victim training entry to be replaced with the new training entry for the new memory address region. On the other hand, in the second replacement policy determination, in response to detecting that no candidate valid training entry specifies the second replacement policy information having reached a second expiry counter value, the replacement control circuitry advances the second replacement policy information for each candidate valid training entry to a next counter value and determines that none of the one or more candidate valid training entries should be replaced with the new training entry for the new memory address region. This approach can help to reduce the likelihood that a given entry is replaced with an entry for a different PC indication relatively shortly after being allocated or updated, but enables replacement of less recently allocated or updated training entries with a training entry for a new PC indication different to the previous contract PC indication for the victim training entry.

For the second replacement policy determination, if there is more than one candidate valid training entry which has the second replacement policy information that has reached the second expiry counter value, the replacement control circuitry can select any of those multiple candidate valid training entries as the victim training entry to be replaced with the new training entry for the new memory address region. For example, a further replacement policy can be used to select which of two or more candidate valid training entries is the victim training entry for the second replacement policy determination. The further replacement policy could be random, round robin, LRU (least recently used), RRIP (re-reference interval prediction), for example, or any other known replacement policy.

Advancing the first/second replacement policy information to the next counter value may be either an increment of the counter value or a decrement of the counter value. In an incrementing implementation, the first/second reset counter value may be lower than the first/second expiry counter value and each advancement of the counter increments the counter value towards the expiry counter value. In a decrementing implementation, the first/second reset counter value may be higher than the first/second expiry counter value and each advancement of the counter decrements the counter value down towards the expiry counter value. It is not essential to use the same approach for both counters—e.g. one of the first replacement policy information could use an incrementing implementation and the other could use a decrementing implementation. Alternatively, both first/second replacement policy information could be incrementing counters or both could be decrementing counters. Although many implementations may use an increment/decrement step size of 1, this is not essential and other implementations could increment/decrement in steps of 2 or more.

The number of advancement (increment/decrement) steps between the first reset counter value and first expiry counter value may be larger than the number of advancement steps between the second reset counter value and the second expiry counter value. The first replacement policy information may comprise an X-bit counter and the second replacement policy information comprises a Y-bit counter, where $X>Y$. This can be useful to skew the probability of replacement to be less likely in cases where the region-mismatching training memory access request corresponds to the same PC indication as a valid training entry than where the region-mismatching training memory access request corresponds to a PC indication not matching the PC indication for any valid training entry. This tends to improve performance by increasing the likelihood that thrashing is avoided and a given entry has a sufficient training opportunity to learn the behaviour for a corresponding region.

In some examples, the training table may be the only structure used for training and prefetch prediction.

However, in other examples, in response to determining that a victim valid entry of the training table is to be replaced with the new training entry for the new memory address region, the replacement control circuitry may evict the victim valid entry to a pattern history table (PHT). The PHT enables the prefetch circuitry to retain information previously learnt predictions without needing to support an unnecessary large number of training entries. Each additional training entry may be more expensive to maintain than a corresponding PHT entry because of the additional comparison circuit logic needed to compare properties of training memory access requests against each training entry, and because the training entries may record more information than is recorded in the corresponding PHT entries.

Some implementations may implement the PHT as a hardware storage structure implemented using dedicated circuit logic separate from the random access memory (RAM) storage used to store data corresponding to the memory address space being accessed by load/store memory accesses issued by the processing circuitry.

However, in other examples, the PHT may be a memory-based data structure stored in the memory system accessible to the memory access requests issued by the processing circuitry. By storing the PHT in the RAM accessible by load/store accesses issued by the processing circuitry, this avoids the need for a dedicated hardware structure to be implemented which reduces the circuit area and power consumption cost of the system. In implementations where the PHT as a memory-based data structure, the replacement policy discussed above based on the first and second replacement policy information can be particularly useful because the use of the first replacement policy information specific to replacement of an existing valid entry with a new entry for the same PC indication tends to reduce the likelihood that a replacement is made for a new region corresponding to the same PC indication as the existing valid entry, which therefore increases the average length of time for which a given entry for a given PC/region pair is resident in the table. This will tend to reduce the number of evictions to the PHT which saves energy because there will be a reduced number of PHT reads/writes to the memory system. It becomes more likely that more than one offset can be recorded in the prediction information in the period when an entry for a given PC/region pair is resident in the training table, rather than evicting to the PHT when no offset, or only a single offset, has been recorded. Hence, the replacement policy helps to save power as well as improving prefetch coverage.

On eviction of the victim valid entry to the pattern history table, the replacement control circuitry may set a corresponding pattern history table entry to associate the PC indication and the prediction information of the victim valid entry. Again, the association between the PC indication in the prediction information can be recorded in the PHT in different ways. In some cases the PC indication need not be stored explicitly in the corresponding PHT entry because the PC indication can be used as an index into the PHT (where the index is used to select which PHT entry to read/write). The region indication, first replacement policy information and second replacement policy information of the victim valid training entry can be discarded when evicting to the PHT and need not be stored within the corresponding PHT entry.

The PHT may be used for prediction lookups. Hence, when performing a prediction lookup to determine whether to generate one or more prefetch requests in response to an issued memory access request issued by the processing circuitry, the prefetch circuitry may look up both the training table and the pattern history table based on a PC address associated with an issued memory access request, and in response to detecting that the PC address associated with the issued memory access request corresponds to the PC indication of a valid pattern history table entry, to use the prediction information of the corresponding valid pattern history table entry to generate one or more prefetch requests. Hence the PHT can effectively be seen as an extension of the training table which records previously trained predictions that are able to be used for prefetch generation, but the contents of PHT entries is not subject to training to reduce the power/circuit area cost.

In cases where a new entry is allocated to the training entry, if the corresponding PC indication hits in the PHT then prediction information stored in that PHT entry can be restored to the newly allocated training entry.

Specific examples will now be discussed with respect drawings. It will be appreciated that the claims are not limited to the examples shown in the drawings.

FIG. 1 schematically illustrates an example of a data processing apparatus 2. The data processing apparatus has a processing pipeline 4 (an example of processing circuitry) which includes a number of pipeline stages. The processing pipeline executes instructions to perform corresponding operations as defined in an instruction set architecture. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions as defined in the instruction set architecture, which are decoded by the decode stage 10, and the corresponding micro-operations processed by the execute stage 16. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. While the MMU 28 is shown as a single entity shared for both data and instructions, other examples may provide a separate instruction-MMU and data-MMU which handle the MMU functions for instruction/data memory access requests respectively.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness.

The apparatus 2 also has prefetch circuitry 40 for generating prefetch requests to request prefetching of information associated with a prefetch target address to a cache. In this example, the prefetch circuitry is data prefetch circuitry 40 for prefetching data into a data cache (e.g. the level 1 data cache 30, although other examples could prefetch into the level 2 cache 32 or a subsequent data cache). Although not shown in FIG. 1, instruction prefetch circuitry could also be provided for prefetching instructions into an instruction cache (e.g. the level 1 instruction cache 8, although other examples could prefetch instructions into the level 2 cache 32 or a subsequent cache). The techniques below could be used for either data or instruction prefetching.

Figure 2:
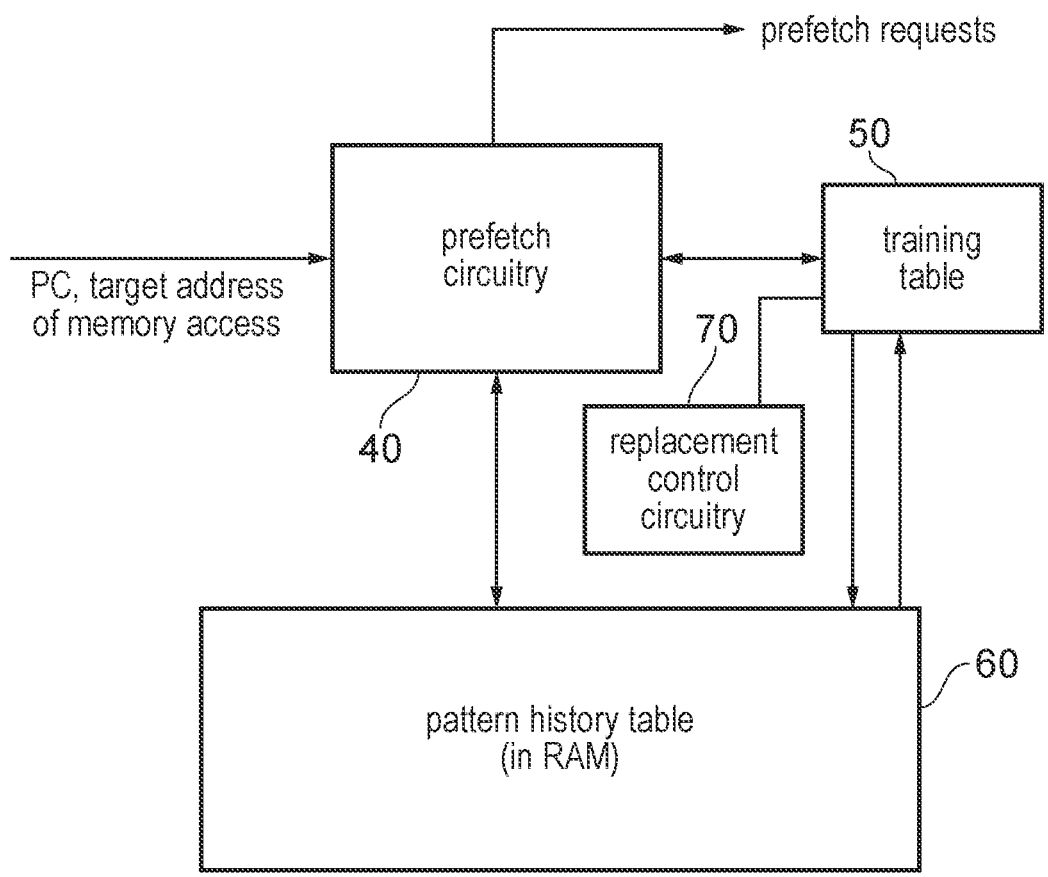
FIG. 2 illustrates the prefetch circuitry.

FIG. 2 illustrates prefetching in more detail. The prefetch circuitry 40 maintains a training table 50 storing predictions which are learnt from behaviour of training memory access requests selected by the prefetch circuitry 40 for training the training table 50. For example, the training memory access requests could be a subset of the load requests issued by the load/store unit 26 of the processing circuitry 4 (e.g. the requests selected as training memory access request may include load requests which miss in the level 1 data cache 30, and the prefetch circuitry 40 could also perform sampling of the issued load requests based on a sample counter for example). For each training request, the prefetch circuitry 40 receives an indication of the program counter (PC) address (instruction address) of the corresponding memory access instruction and the target address identifying the memory system location to be accessed by the request. The training of the prefetch circuitry 40 could be either based on virtual addresses or based on translated physical addresses translated by the MMU 28.

A pattern history table (PHT) 60 is maintained as a memory-based structure stored in the memory system 30, 32, 34. The PHT 60 enables retention of information from training entries that have been evicted from the training table 50 due to capacity conflicts. Replacement control circuitry 70 is responsible for controlling the determination of whether an existing training table entry should be replaced with a new entry.

For prefetch generation, the PC of an issued memory access request (which may or may not be a training memory access request used for training the training table 50) is used to look up both the training entries of the training table 50 and the PHT entries of the PHT 60 and if the PC hits against any valid entry of the training table 50 or PHT 60 then the prediction information in that entry is used to generate one or more prefetch requests for prefetching, to a given target cache, information from addresses predicted based on the prediction information. The target cache into which the prefetched information is allocated could be the level 1 data cache 30 or level 2 cache 32 for example (or for an instruction prefetcher could be the instruction cache 8). The PHT 60 is used for prediction lookups and evictions from the training table 50 and is not used for training, so even if a training memory access request would correspond to an entry in the PHT 60, that PHT 60 entry would not be updated based on the training memory access.

Figure 3:
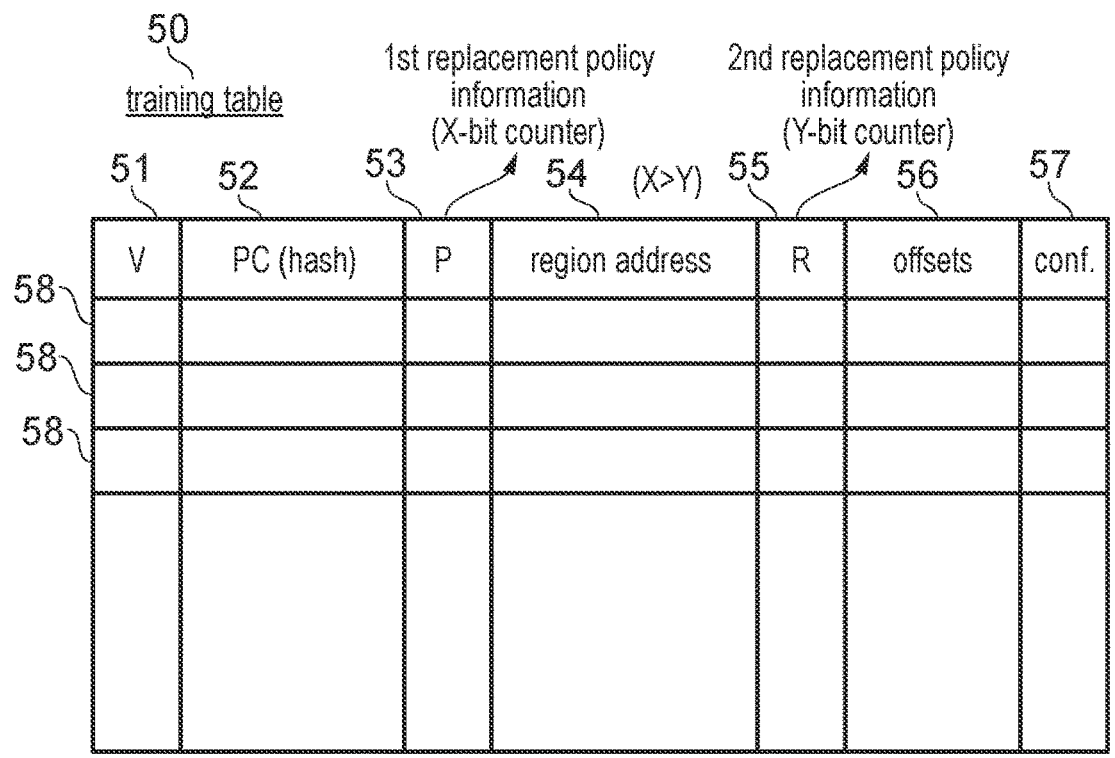
FIG. 3 illustrates a training table and a pattern history table.
Figure 3:
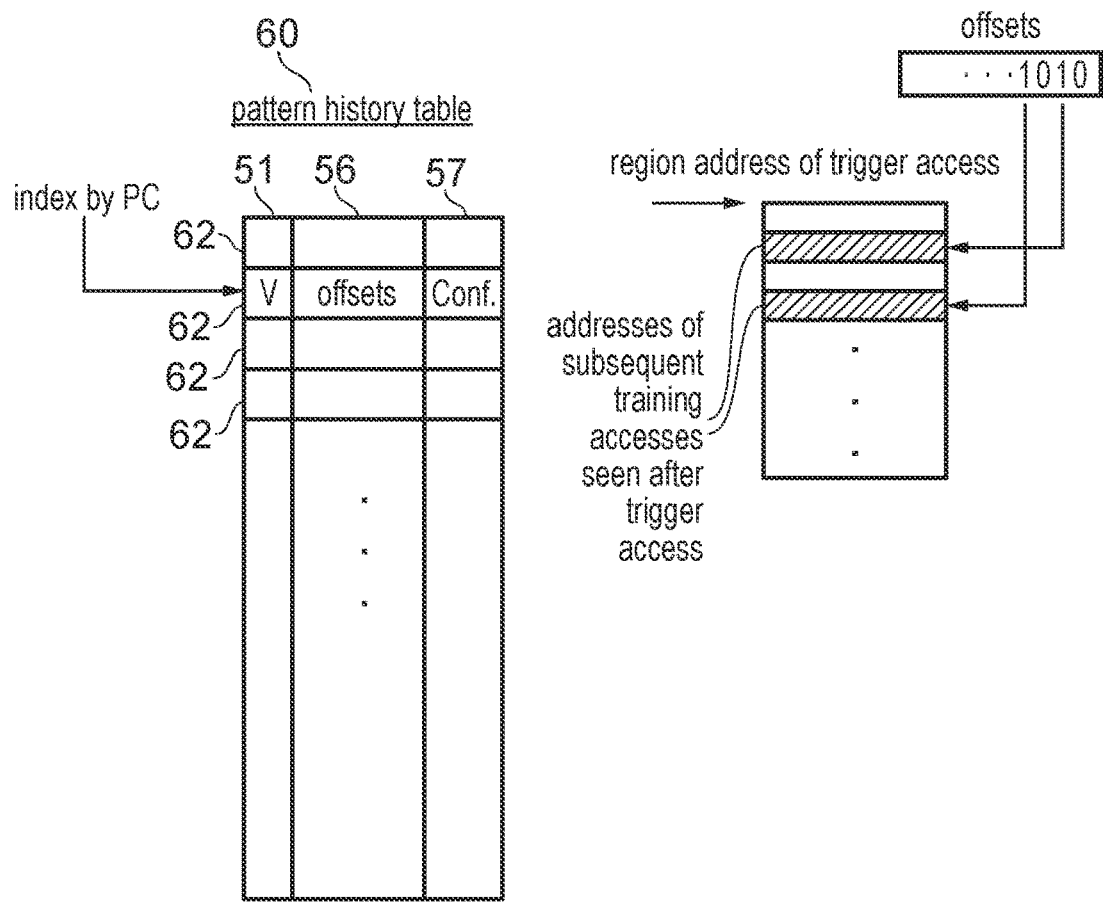

FIG. 3 illustrates an example of the training table 50 and PHT 60 in more detail. In this example, the prefetch circuitry 40 acts as a SMS (Spatial Memory Streaming) Prefetcher which tries to detect access patterns represented as offsets in a region of address space, indicating the addresses of subsequent accesses which follow a first access to the region. The first access to the region is called a "trigger" memory access request. Each entry of the training table 50 represents a corresponding region of memory address space of a given size, e.g. 1 KB or 2 KB, and associates:

a valid indication (V) 51 indicating whether the entry is valid;

a PC indication 52 derived from the PC of the trigger access. In this example, the PC indication 52 provides an imprecise indication of the PC of the trigger access, so that two or more accesses with different PC addresses can share the same PC indication. For example, the PC indication 52 could be a proper subset of bits of the PC, or could be a hash value derived from the PC by applying a hash function which generates an output PC indication with fewer bits than the original PC address. Storing an imprecise indication of the PC can permit some false positive matches, but is useful to reduce the size of each training entry.

First replacement policy information 53 used to control replacement of a valid training entry for a given PC indication and first region with a new entry corresponding to the same given PC indication but a different second region. For example, the first replacement policy information may be a first counter 53, referred to in shorthand as the "P" counter (P for Program-counter).

A region indication 54 derived from the target address of the trigger access, which represents the memory address region associated with the trigger access. For example, the region indication may be derived from a number of most significant bits of the target address of the trigger access (lower bits of the target address that distinguish different addresses within the same region can be ignored for the purpose of generating the region indication 54).

Second replacement policy information 55 used to control replacement of a valid training entry for a first PC indication and a first region with a new entry corresponding to a different second PC indication and a different second region. For example, the second replacement policy information can be a second counter 55, labelled the "R" counter (R for Region).

Prediction information 56, 57 derived from subsequent training memory accesses to the same region as accessed by the trigger memory access. The prediction information 56, 57 can be any information used to form prefetch predictions, but in this example includes:

an offset field 56 which provides a bitmap where each bit of the bitmap indicates whether a corresponding address offset, indicated relative to the region address 54, is indicated as predicted to follow the trigger access. For example, the bottom right of FIG. 3 shows an example in which bits of 1 in the bitmap indicate the address offsets within the region that have been detected for subsequent training accesses after the trigger access, while bits of 0 in the bitmap indicate address offsets not seen as following the trigger access.

a confidence field 57 indicating a level of confidence associated with the offset predictions indicated in the training entry 58.

This is just one example and other examples could provide a different set of prediction information. For example, instead of indicating a bitmap of offsets, the address prediction could indicate a stride value specified for the PC/region pair. Also, other information could be included, such as timeliness information indicating the likelihood that a prefetch based on the predictions indicated in the training entry 58 will enable the corresponding information to be prefetched into a cache in time for servicing the corresponding data access.

The pattern history table (PHT) 60 is a data structure stored in memory 30, 32, 34 and is indexed by the PC indication for a issued memory access request being looked up for prefetch generation or the PC indication for a training memory access request which causes an eviction or restoration to or from the PHT 60. The replacement control circuitry 70 may have access to a PHT base address register which indicates a base address of the PHT data structure in the memory address space. This allows the replacement control circuitry 70 to generate the memory access requests issued to read or write data from or to the PHT 60. Although the underlying PHT structure is stored in memory, information from the PHT can be cached within the data caches 30, 32 for faster access. Some implementations may also provide some dedicated caching structure local to the prefetcher 40 for caching a subset of the PHT information. Alternatively, lower cost implementations may not support the ability to cache PHT information local to the prefetcher 40 using a dedicated structure separate from the data caches 30, 32, although may still be able to cache PHT information in the data caches 30, 32.

Each PHT entry 62 of the PHT 60 associates the PC indication used as an index into the PHT 60 with a valid indication (V) 51 and prediction information 56, 57 (e.g. offsets 56 and confidence 57). The valid indication 51 and prediction information 56, 57 of a given PHT entry is based on the corresponding information 51, 56, 57 in the training table entry 58 which was evicted to form that PHT entry 62. The region address 54 and replacement counters 53, 55 can be discarded on evicting to the PHT, because the replacement counters are only needed for controlling replacement of training entries 58 of the training table 50, and the region address is not needed for prefetch generation, because for prefetch generation the offsets 56 are applied relative to a region address derived from the target address of a trigger access, which can differ from the region used for training of the prediction information when that trigger access was previously encountered. Hence, the same offsets 56 can be applied to different regions accessed by a given trigger access corresponding to a given PC indication, to account for a particular load instruction having its address pointer changing value between different instances of executing the load. As it can be common that the pattern of subsequent address offsets may be the same regardless of which region the address pointer of the trigger load points to, it can be useful to make the predictions based on the offsets applied independent of any region address 54. The region address 54 is used during training to track subsequent accesses to the same region as accessed by the trigger access which caused the training entry to be allocated, but the region address is not needed for prefetch generation.

In this example, the structure of the training table 50 is such that the training table is limited to recording a single region 54 per PC indication 52. Therefore, there is uniqueness of a given PC indication in the training table 50, which means that, when trying to allocate a new entry (for a region that does not exist yet in the training table 50) a PC-based lookup is done, and if there is a hit for the PC of the training access being looked up, the entry with the matching PC indication is replaced (none of the other entries can be replaced because of the restriction that there is only a single region per PC). The restriction of one region per PC is useful to limit the circuit area and power cost of the prefetch circuitry, which can be important for relatively low-end microprocessor systems for which energy efficiency and low manufacturing cost can be more important than high performance.

However, a problem with this approach is that, for typical workloads, to be able to track all the streams of accesses being seen at a given time efficiently to enable a high prefetch coverage, the training table may really need to have dozens or hundreds of entries, but the circuit area and power cost of that many training entries may be too expensive for many low-cost processor systems which may require keeping area and power budgets in check. Therefore, many implementations may implement a smaller number of training entries, and so only a subset of the streams being seen as active may be able to train at a given time.

These constraints mean that in practice there will be many more PC-region pairs for which it would be desirable to be able to allocate an entry 58 in the training table 50 than the number of entries which can actually fit in the training table 50, and so if a load at a given PC has a behaviour which causes that load to switch between accessing different address regions at different points in the program (e.g. different iterations of a loop or different instances of calling a function), this could lead to an entry allocated for a given PC-region pair being replaced and evicted to the PHT 60 before it has adequately had time to train, due to an instance when the load at that PC moved to another region of address space while the entry for the previous region would still have been of some use. This has several disadvantages. In case of eviction of a given training entry 58 having seen only one training request to the corresponding region (the trigger request itself), no useful prediction information can be learnt even if later accesses would have been seen to that region. The drop of "empty trigger addresses" is a first source of sub-efficiency in tracking the input streams in case of slow streams or very intensive tests with a lot of streams that would not fit a small training table 50. Also, evictions of training entries 58 to the PHT 60 where relatively few bits are set in the offset field 56 are not efficient from the perspective of the write operations to the PHT 60, as it might cause multiple writes for several evictions of the same entry over a period of time, instead of a reduced amount of write operations to the PHT 60.

In the approach shown in FIG. 3, two pieces of replacement policy information are provided per training entry 50: the P counter 53 (first replacement policy information) used to control replacement of an entry with another entry for the same PC indication, and the R counter 55 (second replacement policy information) used to control replacement of an entry with another entry for a different PC indication. The P counter 53 may be an X-bit counter and the R counter 55 may be a Y-bit counter, where X>Y. This helps to provide a lower probability of making a replacement for a new region with the same PC indication, than when making a replacement for a new region with a different PC indication.

Hence, the replacement policy handles two dimensions: a PC (Program Counter) dimension, and an address (region) based dimension. This replacement policy allows to keep for longer training entries 58 that would have otherwise been evicted due a given PC moving to another region of address space while the entry would still be of use. The two dimensional replacement policy can bias against replacing a given entry 58 for a region/PC pair too early, reducing the chance of thrashing between different regions for the same PC, and hence giving more opportunity for one of those regions to train. Hence, the 2D replacement policy allows to:

avoid increasing the area of data structures such as the training table 50 (which might otherwise be needed to provide a given level of performance if a standard replacement policy was used);

reduce the power consumption by reducing the transactions from/to PHT and the drop of "empty trigger addresses" with zero offsets specified in the offset field 56; and improve performance in case of an input stream with a wide number of combinations of PC/regions that could trash the training table and not allow the prefetch circuitry 40 to train on any of these streams.

Figure 4:
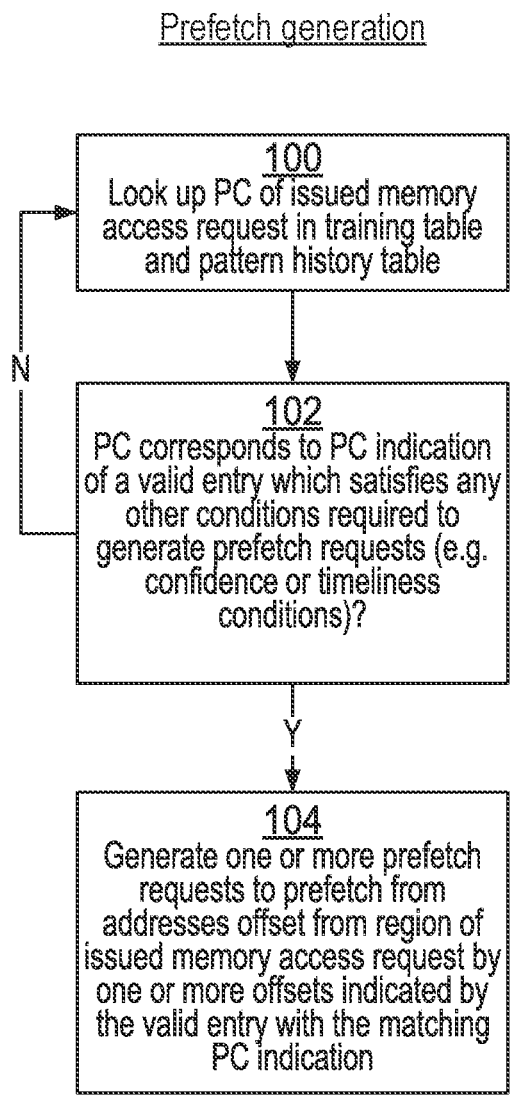
FIG. 4 is a flow diagram illustrating prefetch generation.

FIG. 4 is a flow diagram showing a method of prefetch generation. At step 100, the prefetch circuitry 40 looks up a PC indication derived from the PC of an issued memory access request in the training table 50 and the PHT 60. At step 102, the prefetch circuitry 40 determines whether the PC of the issued memory access request corresponds to the PC indication of a valid training entry 58 or PHT entry 62 which satisfies any other conditions required to generate prefetch requests. For the training table, the matching of the PC indication may be performed by comparing the PC indication field 52 of each valid training entry 58 with the PC indication derived from the PC of the issued memory access request. For looking up the PHT 60, the PC indication of the issued memory access request may be used as an index into the data structure to select a particular PHT entry 62 to read, and a hit may be detected if that entry has the valid indication 51 specifying a valid entry. If implemented, the other conditions used to qualify a hit may include a confidence condition which depends on the level of confidence 57 expressed for the entry for the corresponding PC indication, and/or a timeliness condition which depends on a timeliness parameter associated with that entry. If the PC of the issued memory access request does not correspond to the PC indication of any valid entry, or the PC of the issued memory access request does correspond to the PC indication of the valid entry but any other conditions required for a hit are not satisfied, then the method proceeds to step 100 to perform a lookup for another issued memory access request. If the PC of the issued memory access request does correspond to the PC indication of a valid training entry 58 or PHT entry 62 and any other implemented conditions required for a hit are satisfied, then at step 104 the prefetch circuitry generates one or more prefetch requests to prefetch information into the cache, with the prefetched information being the information at one or more addresses which are offset, relative to a reference address corresponding to the memory address region accessed by the issued memory access request, by one or more offsets indicated in the offset field 56 of the valid training entry 58 or PHT entry 62 which was found to correspond to the PC indication derived from the PC of the issued memory access request.

Figure 5:
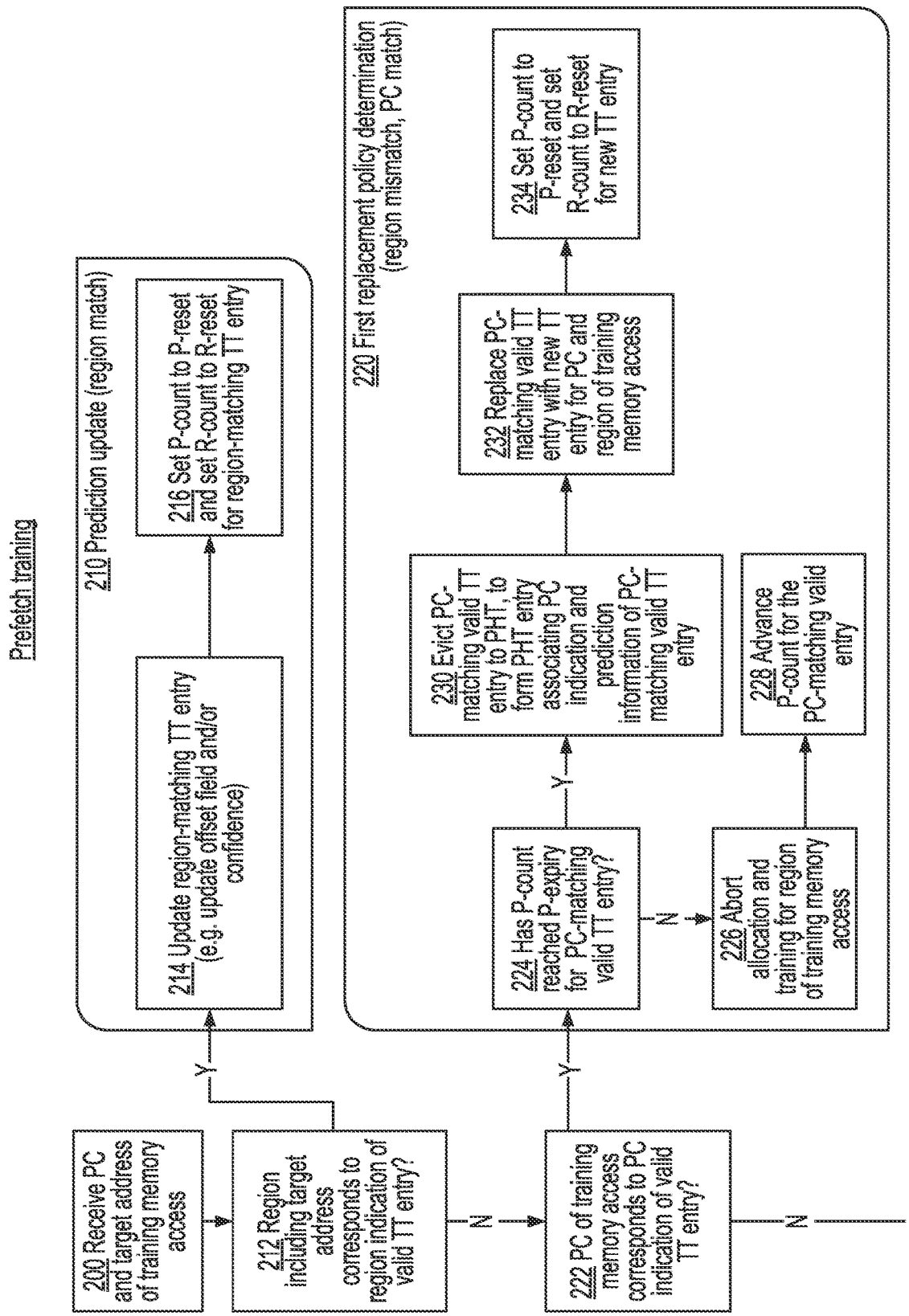
FIG. 5 is a flow diagram illustrating prefetch training.
Figure 5:
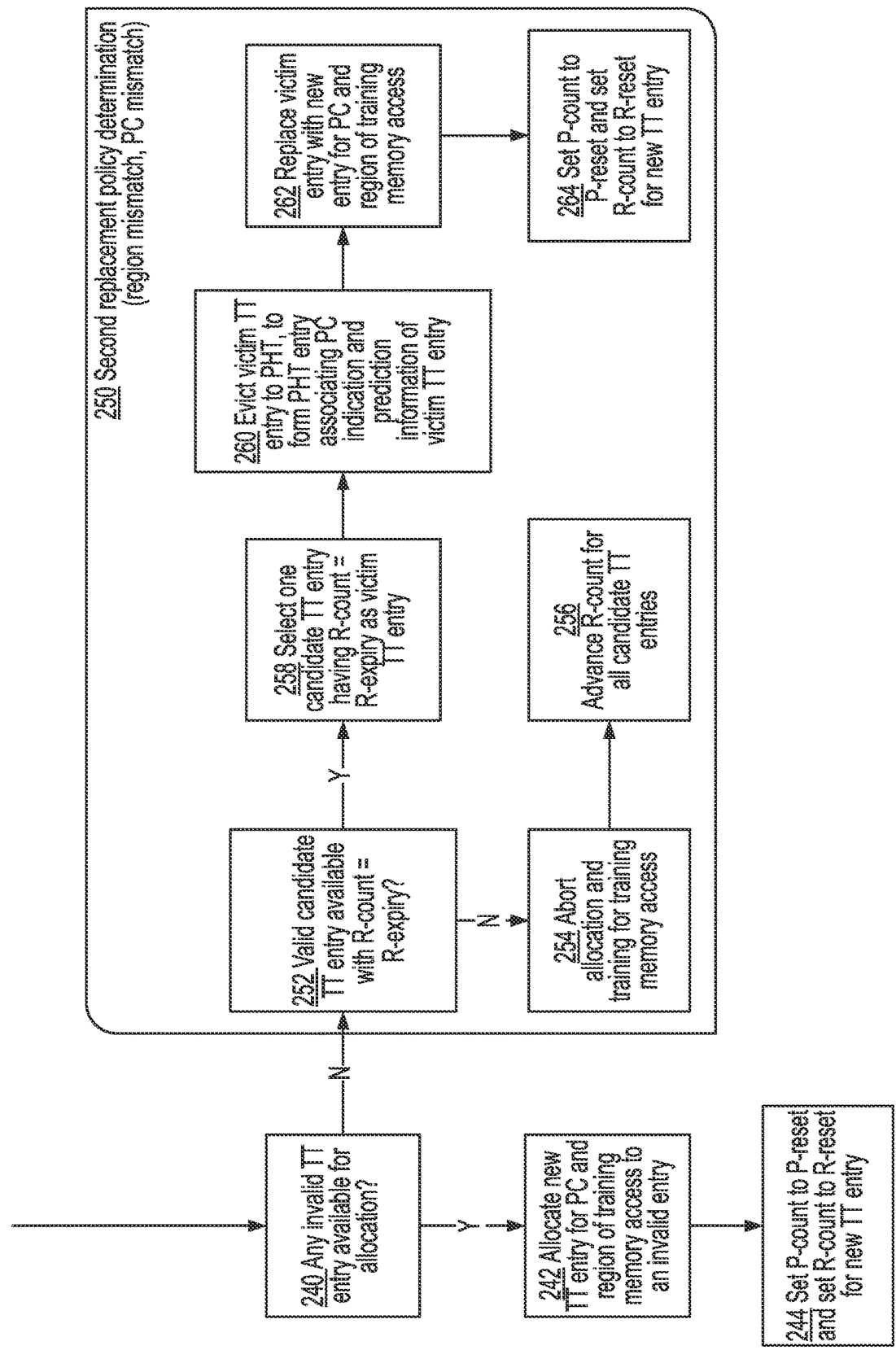

FIG. 5 illustrates a method of prefetch training. At step 200, the PC and target address of a training memory access request are received by the prefetch circuitry 40. At step 212, the prefetch circuitry 40 determines whether the memory address region including the target address of the training memory access corresponds to the region indication 54 of any valid training table entry (TT entry) 58. If so, then a prediction update process 210 is performed to update prediction information 56, 57 for the matching memory address region. The prediction update process 210 includes, at step 214, updating prediction information 56, 57 of the region-matching training entry whose region indication 54 corresponds to the region accessed by the training memory access. For example, the offset field 56 of the region-matching training entry can be updated to set an offset bit which corresponds to the target address of the training memory access, and/or the confidence indication 57 can be updated to account for any change in level of confidence depending on whether the behaviour of the training memory access reinforces a prediction already indicated in the region-matching training entry 58. Also, at step 216, the P counter 53 of the region-matching training entry is reset to a first reset value "P-reset" and the R counter 55 of the region-matching training entry is reset to a second reset value "R-reset".

If at step 212, the memory address region including the target address of the training memory access did not correspond to the region indication of any valid training entry 58 of the training table 50, then the replacement control circuitry 70 determines whether a new entry 58 of the training table 50 should be allocated for the newly seen memory address region. The replacement control circuitry 70 performs a first replacement policy determination 220 in the case when there is a region mismatch but a PC match between the training memory access and an existing valid training entry 58, and forms a second replacement policy determination 250 in the case where there is a region mismatch and also a PC mismatch for all valid entries of the training table in a case where there is no valid entry 58 available for allocation. The replacement policy determinations 220, 250 are discussed in more detail below.

Hence, at step 222, the replacement control circuitry 70 determines whether the PC of the training memory access corresponds to the PC indication 52 for any valid training entry 58. If the PC of the training memory access corresponds to the PC indication 52 of a valid training entry, then the first replacement policy determination 220 is performed. The valid training entry which has the matching PC indication is referred to as the "PC-matching" valid training entry.

In the first replacement policy determination 220, at step 224 the replacement control circuitry 70 determines whether the P counter 53 (first replacement policy information) of the PC-matching valid training entry 58 has reached a first expiry value "P-expiry". If not, then at step 226 the attempt to allocate and train a new entry for the region accessed by the training memory access is aborted, and so no entry replacement is made in the training table. At step 228, the replacement control circuitry 70 updates the P counter 53 of the PC-matching valid training entry to advance the P counter 53 to its next value (this advancement could be either an increment or decrement of the P counter 53, depending on whether the counter is reset high or low when set to P-reset). The R counter 55 of the PC-matching valid training entry is not changed at step 228.

If, at step 224, the replacement control circuitry 70 determines that the P counter 53 has reached the first expiry value "P-expiry", then at step 230 the replacement control circuitry 70 determines that a replacement should be made to evict the PC-matching valid training entry 58 to the PHT 60. The replacement control circuitry 70 forms a PHT entry 60 specifying the valid flag 51 and prediction information 56, 57 of the PC-matching valid training entry 58, and generates one or more write memory access requests to write the formed PHT entry to locations in memory having a memory address corresponding to a result of adding an offset derived from the PC indication 52 of the evicted training entry 58 to a PHT base address read from a PHT base address register associated with the prefetch circuitry 40. Hence, the PHT 60 is updated based on any previously gathered prediction information for the evicted PC-region pair. At step 232, the replacement control circuitry replaces the PC-matching valid training entry with a new training entry for the PC and region associated with the training memory access. The PC indication 52 field can remain the same, but the region indication field 54 is updated to correspond to the new region. At step 234, the replacement control circuitry initialises the first and second replacement policy counters 53, 55 (P and R counters) to the first and second reset values (P-reset and R-reset) respectively. At step 232, if the PHT 60 already includes a valid PHT entry corresponding to the PC of the training memory access then the prediction information fields 56, 57 of the new training entry 58 could be initialised based on corresponding values read from that valid PHT entry 62 corresponding to the PC of the training memory access. Hence, on a new allocation information may be restored from the PHT 60 if available. If there is no corresponding entry in the PHT 60 for the PC of the training memory access, the prediction fields 56 can be initialised to an empty offset bitmap 56 not indicating any address offsets as valid, and a confidence field 57 set to a default level of confidence (e.g. the minimum level of confidence).

If, at step 222, the replacement control circuitry 70 had determined that the PC of the training memory access did not correspond to the PC indication of any valid training entry 58, then at step 240 the replacement control circuitry 70 determines whether any invalid training entry 58 is available for allocation, and if so then at step 242 an invalid entry is allocated as a new training entry for the PC and memory address region corresponding to the training memory access. Thus, the selected entry is made valid, and again at step 244 the P counter 53 and R counter 55 are reset to their initial values P-reset and R-reset respectively. Again, if there is corresponding information for the PC of the training memory access stored in the PHT 60 then it can be restored to the newly allocated training entry 58, while otherwise the fields 56, 57 can be initialised as described for step 232.

If at step 240 the replacement control circuitry 70 determines that there is no invalid training entry 58 available for allocation, then the replacement control circuitry 70 performs the second replacement policy determination 250, which comprises, at step 252, the replacement control circuitry 70 checking whether there is any valid candidate training entry available for allocation which specifies an R count value 55 equal to a second expiry value "R-expiry". The candidate training entries for which the R counters 55 are checked for expiry could include all the training entries 58 of the table or may only include a restricted subset of entries, depending on the associativity of the training table structure. If there is no valid candidate training entry 58 with an expired R counter 55, then at step 254 the attempted allocation training is aborted for the current training memory access and so no replacement is made, and at step 256 the second replacement policy information (R counters 55) are advanced to their next count value for all the candidate training entries.

In the second replacement policy determination 250, if at step 252 at least one valid candidate training entry 58 is available with an expired R counter 55, then at step 258 the replacement control circuitry 70 selects one of the candidate training entries having the expired R counter 55 as a victim training entry 58. Any replacement policy can be used for selecting the victim training entry 58 in the case where more than one valid candidate training entry has an expired R counter 55 (e.g. the further replacement policy for selecting the victim training entry 58 at step 258 could be random, round robin, LRU, RRIP, etc.). At step 260 the replacement control circuitry performs an eviction of the selected victim training entry 58 to the PHT 60 in the same way as done for the eviction performed at step 230. At step 262, the victim entry is replaced with a new entry for the PC and the memory address region corresponding to the training memory access (as at step 232, it is possible for some information to be restored from the PHT 60 at this point, if there is valid information corresponding to the PC of the training memory access stored in the PHT 60, and otherwise the fields 56, 57 may be initialised as described above). At step 264, the P and R counters 53, 55 are reset to their respective reset values P-reset, R-reset for the newly allocated training entry 58.

In summary, this replacement policy gives multiple chances for an entry to remain in the table before being replaced in both cases (first replacement policy determination for matching PC, second replacement policy determination for mismatching PC). Two counters (P and R) are provided per entry and when a training input matches the region and updates an entry, both counters are reset to their initial values P-reset, R-reset. When a replacement could be made because a mismatching region has been identified for the latest training example, a victim is selected for replacement if the appropriate counter (P if the PC matched, R if the PC mismatched) of an existing valid entry has expired. No replacement is made if the relevant counter has not expired.

Hence, the following approach is taken to controlling replacement of training entries 58:

Look for a PC matching entry, if there is a hit, look at the P counter of the entry, if it has expired, proceed to allocate over this entry, otherwise advance the P counter of that entry and abort the allocation.

If no entry matches on the PC and there is no invalid entry, select a victim with the R counter, look for an entry that has its R counter expired. If there is such an entry, proceed to allocate over, otherwise advance the R counter of every entry and abort the allocation.

This replacement policy allows, for example, to keep updating an entry because some accesses are still done in the region even if the accesses updating that entry are separated by other accesses to another region. It allows to avoid resonances and instabilities in case of erratic patterns, as evictions of empty valid Training Table entries (entries that did not see anything else than the trigger access) will just be trashing the Table and not be useful. It also allows to reduce Pattern History Table RAM operations on bit-write enabled RAMs and so reduce the power consumption.

In one example, an 8-bit counter was used for the P-counters 53 and a 1-bit counter for the R-counters 55, so that P-reset=0 and P-expiry=63 for an incrementing counter example (or vice versa, for a decrementing counter example) and R-reset=0 and R-expiry=1 for an incrementing counter example (or vice versa, for a decrementing counter example). This approach was found to give a reasonable performance improvement. The larger number of advancement steps between P-reset and P-expiry compared to the number of steps between R-reset and R-expiry helps to bias replacement away from replacing a PC-region pair with another region for the same PC, to reduce the thrashing problem. Of course, other implementations could choose to use different sized counters, but in general it can be helpful for the P counter 3 to have more bits than the R counter 55.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Examples are set out in the following clauses:

1. An apparatus comprising:
    processing circuitry to issue memory access requests in response to processing of instructions;
    prefetch circuitry to generate prefetch requests to prefetch information to a cache, based on prediction information trained using a training table comprising a plurality of training entries providing information derived from training memory access requests, a given training entry of the training table associating a program counter indication indicative of a program counter address associated with a trigger training memory access, a region indication indicative of a memory address region comprising a target address specified by the trigger training memory access, corresponding prediction information trained based on one or more subsequent training memory access requests specifying target addresses in the same memory address region as the target address of the trigger training memory access, first replacement policy information, and second replacement policy information; and
    replacement control circuitry to control, in response to detecting a region-mismatching training memory access request specifying a target address in a new memory address region which fails to correspond to the region indication of any valid training entry of the training table, whether to allocate a new valid training entry to the training table for the new memory address region; in which:
    in response to detecting that a program counter address associated with the region-mismatching training memory access request corresponds to the program counter indication of a program-counter-matching valid training entry, the replacement control circuitry is configured to perform a first replacement policy determination to determine, based on the first replacement policy information of the program-counter-matching valid training entry, whether to replace the program-counter-matching valid training entry with the new training entry for the new memory address region; and
    in response to detecting that the program counter address associated with the region-mismatching training memory access request fails to correspond to the program counter indication of any valid training entry and there is no invalid entry available for allocation as the new training entry, the replacement control circuitry is configured to perform a second replacement policy determination to determine, based on the second replacement policy information of one or more candidate valid training entries, whether to replace one of the candidate valid training entries with the new training entry for the new memory address region.

2. The apparatus according to clause 1, in which the prefetch circuitry is configured to use the training table to learn prediction information for a single memory address region per program counter indication.

3. The apparatus according to any of clauses 1 and 2, in which a probability of the new training entry being allocated to the training table in the first replacement policy determination is lower than a probability of the new training entry being allocated to the training table in the second replacement policy determination.

4. The apparatus according to any preceding clause, in which in response to detecting a region-matching training memory access request specifying a target address in an already tracked memory address region corresponding to the region indication of a region-matching valid training entry of the training table, the prefetch circuitry is configured to update the prediction information of the region-matching valid training entry based on the region-matching training memory access request.

5. The apparatus according to any preceding clause, in which the prefetch circuitry is configured to perform a prefetch prediction lookup in the training table based on a program counter address associated with an issued memory access request, and in response to detecting that the program counter address associated with the issued memory access request corresponds to the program counter indication of a corresponding valid training entry, to use the prediction information of the corresponding valid training entry to control generation of one or more prefetch requests.

6. The apparatus according to clause 5, in which the prediction information specifies one or more offsets of addresses of the one or more subsequent training memory access requests relative to the memory address region comprising the target address specified by the trigger training memory access; and
    in response to detecting that the program counter address associated with the issued memory access request corresponds to the program counter indication of the corresponding valid training entry, the prefetch circuitry is configured to generate the one or more prefetch requests specifying one or more target addresses determined by applying the one or more offsets specified in the prediction information of the corresponding valid training entry to a reference address based on the target address of the issued memory access request.

7. The apparatus according to clause 6, in which the prediction information is capable of specifying, in association with a given program counter indication and a given region indication, a plurality of offsets for a plurality of subsequent training memory access requests.

8. The apparatus according to any preceding clause, in which in response to a new allocation of, or an update of the prediction information for, a given training entry in the training table, the replacement control circuitry is configured to reset the first replacement policy information of the given training entry to a first reset counter value and to reset the second replacement policy information to a second reset counter value.

9. The apparatus according to any preceding clause, in which in the first replacement policy determination, in response to detecting that the first replacement policy information has reached a first expiry counter value, the replacement control circuitry is configured to determine that the program-counter-matching valid training entry should be replaced with the new training entry for the new memory address region.

10. The apparatus according to any preceding clause, in which, in the first replacement policy determination, in response to detecting that the first replacement policy information has not yet reached a first expiry counter value, the replacement control circuitry is configured to advance the first replacement policy information to a next counter value and to determine that the program-counter-matching valid training entry should not be replaced with the new training entry for the new memory address region.

11. The apparatus according to any preceding clause, in which, in the second replacement policy determination, in response to detecting that the second replacement policy information of at least one candidate valid training entry has reached a second expiry counter value, the replacement control circuitry is configured to select one candidate valid training entry having the second replacement policy information that has reached the second expiry counter value as a victim training entry to be replaced with the new training entry for the new memory address region.

12. The apparatus according to any preceding clause, in which in the second replacement policy determination, in response to detecting that no candidate valid training entry specifies the second replacement policy information having reached a second expiry counter value, the replacement control circuitry is configured to advance the second replacement policy information for each candidate valid training entry to a next counter value and to determine that none of the one or more candidate valid training entries should be replaced with the new training entry for the new memory address region.

13. The apparatus according to any preceding clause, in which the first replacement policy information comprises an X-bit counter and the second replacement policy information comprises a Y-bit counter, where X>Y.

14. The apparatus according to any preceding clause, in which in response to determining that a victim valid entry of the training table is to be replaced with the new training entry for the new memory address region, the replacement control circuitry is configured to evict the victim valid entry to a pattern history table.

15. The apparatus according to clause 14, in which the pattern history table is a memory-based data structure stored in the memory system accessible to the memory access requests issued by the processing circuitry.

16. The apparatus according to any of clauses 14 and 15, in which on eviction of the victim valid entry to the pattern history table, the replacement control circuitry is configured to set a corresponding pattern history table entry to associate the program counter indication and the prediction information of the victim valid entry.

17. The apparatus according to any of clauses 14 to 16, in which, when performing a prediction lookup to determine whether to generate one or more prefetch requests in response to an issued memory access request issued by the processing circuitry, the prefetch circuitry is configured to look up both the training table and the pattern history table based on a program counter address associated with an issued memory access request, and in response to detecting that the program counter address associated with the issued memory access request corresponds to the program counter indication of a valid pattern history table entry, to use the prediction information of the corresponding valid pattern history table entry to generate one or more prefetch requests.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:
1. An apparatus comprising:
processing circuitry to issue memory access requests in response to processing of instructions;
prefetch circuitry to generate prefetch requests to prefetch information to a cache, based on prediction information trained using a training table comprising a plurality of training entries providing information derived from training memory access requests, a given training entry of the training table associating a program counter indication indicative of a program counter address associated with a trigger training memory access, a region indication indicative of a memory address region comprising a target address specified by the trigger training memory access, corresponding prediction information trained based on one or more subsequent training memory access requests specifying target addresses in the same memory address region as the target address of the trigger training memory access, first replacement policy information, and second replacement policy information; and
replacement control circuitry to control, in response to detecting a region-mismatching training memory access request specifying a target address in a new memory address region which fails to correspond to the region indication of any valid training entry of the training table, whether to allocate a new valid training entry to the training table for the new memory address region; in which:

in response to detecting that a program counter address associated with the region-mismatching training memory access request corresponds to the program counter indication of a program-counter-matching valid training entry, the replacement control circuitry is configured to perform a first replacement policy determination to determine, based on the first replacement policy information of the program-counter-matching valid training entry, whether to replace the program-counter-matching valid training entry with the new training entry for the new memory address region; and in response to detecting that the program counter address associated with the region-mismatching training memory access request fails to correspond to the program counter indication of any valid training entry and there is no invalid entry available for allocation as the new training entry, the replacement control circuitry is configured to perform a second replacement policy determination to determine, based on the second replacement policy information of one or more candidate valid training entries, whether to replace one of the candidate valid training entries with the new training entry for the new memory address region.

2. The apparatus according to claim 1, in which the prefetch circuitry is configured to use the training table to learn prediction information for a single memory address region per program counter indication.

3. The apparatus according to claim 1, in which a probability of the new training entry being allocated to the training table in the first replacement policy determination is lower than a probability of the new training entry being allocated to the training table in the second replacement policy determination.

4. The apparatus according to claim 1, in which in response to detecting a region-matching training memory access request specifying a target address in an already tracked memory address region corresponding to the region indication of a region-matching valid training entry of the training table, the prefetch circuitry is configured to update the prediction information of the region-matching valid training entry based on the region-matching training memory access request.

5. The apparatus according to claim 1, in which the prefetch circuitry is configured to perform a prefetch prediction lookup in the training table based on a program counter address associated with an issued memory access request, and in response to detecting that the program counter address associated with the issued memory access request corresponds to the program counter indication of a corresponding valid training entry, to use the prediction information of the corresponding valid training entry to control generation of one or more prefetch requests.

6. The apparatus according to claim 5, in which the prediction information specifies one or more offsets of addresses of the one or more subsequent training memory access requests relative to the memory address region comprising the target address specified by the trigger training memory access; and in response to detecting that the program counter address associated with the issued memory access request corresponds to the program counter indication of the corresponding valid training entry, the prefetch circuitry is configured to generate the one or more prefetch requests specifying one or more target addresses determined by applying the one or more offsets specified in the prediction information of the corresponding valid training entry to a reference address based on the target address of the issued memory access request.

7. The apparatus according to claim 6, in which the prediction information is capable of specifying, in association with a given program counter indication and a given region indication, a plurality of offsets for a plurality of subsequent training memory access requests.

8. The apparatus according to claim 1, in which in response to a new allocation of, or an update of the prediction information for, a given training entry in the training table, the replacement control circuitry is configured to reset the first replacement policy information of the given training entry to a first reset counter value and to reset the second replacement policy information to a second reset counter value.

9. The apparatus according to claim 1, in which in the first replacement policy determination, in response to detecting that the first replacement policy information has reached a first expiry counter value, the replacement control circuitry is configured to determine that the program-counter-matching valid training entry should be replaced with the new training entry for the new memory address region.

10. The apparatus according to claim 1, in which, in the first replacement policy determination, in response to detecting that the first replacement policy information has not yet reached a first expiry counter value, the replacement control circuitry is configured to advance the first replacement policy information to a next counter value and to determine that the program-counter-matching valid training entry should not be replaced with the new training entry for the new memory address region.

11. The apparatus according to claim 1, in which, in the second replacement policy determination, in response to detecting that the second replacement policy information of at least one candidate valid training entry has reached a second expiry counter value, the replacement control circuitry is configured to select one candidate valid training entry having the second replacement policy information that has reached the second expiry counter value as a victim training entry to be replaced with the new training entry for the new memory address region.

12. The apparatus according to claim 1, in which in the second replacement policy determination, in response to detecting that no candidate valid training entry specifies the second replacement policy information having reached a second expiry counter value, the replacement control circuitry is configured to advance the second replacement policy information for each candidate valid training entry to a next counter value and to determine that none of the one or more candidate valid training entries should be replaced with the new training entry for the new memory address region.

13. The apparatus according to claim 1, in which the first replacement policy information comprises an X-bit counter and the second replacement policy information comprises a Y-bit counter, where $X>Y$.

14. The apparatus according to claim 1, in which in response to determining that a victim valid entry of the training table is to be replaced with the new training entry for the new memory address region, the replacement control circuitry is configured to evict the victim valid entry to a pattern history table.

15. The apparatus according to claim 14, in which the pattern history table is a memory-based data structure stored in a memory system accessible to the memory access requests issued by the processing circuitry.

16. The apparatus according to claim 14, in which on eviction of the victim valid entry to the pattern history table, the replacement control circuitry is configured to set a corresponding pattern history table entry to associate the program counter indication and the prediction information of the victim valid entry.

17. The apparatus according to claim 14, in which, when performing a prediction lookup to determine whether to generate one or more prefetch requests in response to an issued memory access request issued by the processing circuitry, the prefetch circuitry is configured to look up both the training table and the pattern history table based on a program counter address associated with an issued memory access request, and in response to detecting that the program counter address associated with the issued memory access request corresponds to the program counter indication of a valid pattern history table entry, to use the prediction information of the corresponding valid pattern history table entry to generate one or more prefetch requests.

18. A method comprising:
training prediction information used to generate prefetch requests to prefetch information to a cache, using a training table comprising a plurality of training entries providing information derived from training memory access requests issued by processing circuitry in response to processing of instructions, a given training entry of the training table associating a program counter indication indicative of a program counter address associated with a trigger training memory access, a region indication indicative of a memory address region comprising a target address specified by the trigger training memory access, corresponding prediction information learnt from one or more subsequent training memory access requests specifying target addresses in the same memory address region as the target address of the trigger training memory access, first replacement policy information, and second replacement policy information; and
controlling, in response to detecting a region-mismatching training memory access request specifying a target address in a new memory address region which fails to correspond to the region indication of any valid training entry of the training table, whether to allocate a new valid training entry to the training table for the new memory address region; in which:
in response to detecting that a program counter address associated with the region-mismatching training memory access request corresponds to the program counter indication of a program-counter-matching valid training entry, a first replacement policy determination is performed to determine, based on the first replacement policy information of the program-counter-matching valid training entry, whether to replace the program-counter-matching valid training entry with the new training entry for the new memory address region; and
in response to detecting that the program counter address associated with the region-mismatching training memory access request fails to correspond to the program counter indication of any valid training entry and there is no invalid entry available for allocation as the new training entry, performing a second replacement policy determination to determine, based on the second replacement policy information of one or more candidate valid training entries, whether to replace one of the candidate valid training entries with the new training entry for the new memory address region.

19. A non-transitory computer-readable medium to store computer-readable code for fabrication of an apparatus comprising:
processing circuitry to issue memory access requests in response to processing of instructions;
prefetch circuitry to generate prefetch requests to prefetch information to a cache, based on prediction information trained using a training table comprising a plurality of training entries providing information derived from training memory access requests, a given training entry of the training table associating a program counter indication indicative of a program counter address associated with a trigger training memory access, a region indication indicative of a memory address region comprising a target address specified by the trigger training memory access, corresponding prediction information trained based on one or more subsequent training memory access requests specifying target addresses in the same memory address region as the target address of the trigger training memory access, first replacement policy information, and second replacement policy information; and
replacement control circuitry to control, in response to detecting a region-mismatching training memory access request specifying a target address in a new memory address region which fails to correspond to the region indication of any valid training entry of the training table, whether to allocate a new valid training entry to the training table for the new memory address region; in which:
in response to detecting that a program counter address associated with the region-mismatching training memory access request corresponds to the program counter indication of a program-counter-matching valid training entry, the replacement control circuitry is configured to perform a first replacement policy determination to determine, based on the first replacement policy information of the program-counter-matching valid training entry, whether to replace the program-counter-matching valid training entry with the new training entry for the new memory address region; and
in response to detecting that the program counter address associated with the region-mismatching training memory access request fails to correspond to the program counter indication of any valid training entry and there is no invalid entry available for allocation as the new training entry, the replacement control circuitry is configured to perform a second replacement policy determination to determine, based on the second replacement policy information of one or more candidate valid training entries, whether to replace one of the candidate valid training entries with the new training entry for the new memory address region.

* * * * *